(12) United States Patent
Shiraishi et al.

(10) Patent No.: US 7,278,606 B2
(45) Date of Patent: Oct. 9, 2007

(54) HELICOPTER HAVING A FUSILAGE SECTION AND A TAIL SECTION COUPLED THERETO

(75) Inventors: Takayuki Shiraishi, Tokyo (JP); Kenji Kuramochi, Tokyo (JP); Seiichi Tsuura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/849,132

(22) Filed: May 20, 2004

(65) Prior Publication Data

US 2004/0245377 A1    Dec. 9, 2004

(30) Foreign Application Priority Data

May 23, 2003 (JP) ............................ 2003-146403

(51) Int. Cl.
*B64C 27/04* (2006.01)
(52) U.S. Cl. .................................. 244/17.11
(58) Field of Classification Search ............ 244/17.11, 244/199, 17.19, 47
See application file for complete search history.

(56) References Cited

U.S. PATENT DOCUMENTS

| | | | | | |
|---|---|---|---|---|---|
| 1,361,222 | A | * | 12/1920 | Berliner | 244/102 R |
| 2,413,625 | A | * | 12/1946 | Hays | 244/17.19 |
| 2,466,821 | A | * | 4/1949 | Owen | 244/17.17 |
| 3,103,327 | A | * | 9/1963 | Parry | 244/52 |
| 3,420,472 | A | * | 1/1969 | Boudes | 244/7 B |
| 3,774,220 | A | * | 11/1973 | Martin et al. | 343/708 |
| 4,055,303 | A | * | 10/1977 | Brown | 239/142 |
| 4,708,305 | A | * | 11/1987 | Kelley et al. | 244/17.19 |
| 5,209,430 | A | * | 5/1993 | Wilson et al. | 244/17.19 |
| 5,437,419 | A | * | 8/1995 | Schmitz | 244/17.11 |
| 5,918,832 | A | * | 7/1999 | Zerweckh | 244/48 |
| 6,086,016 | A | * | 7/2000 | Meek | 244/17.11 |
| 6,352,220 | B1 | * | 3/2002 | Banks et al. | 244/17.19 |
| 2002/0125368 | A1 | * | 9/2002 | Phelps et al. | 244/17.23 |

* cited by examiner

*Primary Examiner*—Tien Dinh
(74) *Attorney, Agent, or Firm*—Birch, Stewart, Kolasch & Birch, LLP

(57) ABSTRACT

A helicopter having: a flow control device provided at one of a lower portion of a side surface of a fuselage and a portion on a lower surface of the fuselage near the side surface and extending downward.

28 Claims, 4 Drawing Sheets

UPPER

LEFT ← → RIGHT

LOWER

FRONT ←→ REAR

FRONT ←→ REAR

HELICOPTER HAVING A FUSILAGE SECTION AND A TAIL SECTION COUPLED THERETO

This Nonprovisional application claims priority under 35 U.S.C. § 119(a) on Patent Application No(s). 2003-146403 filed in Japan on May 23, 2003, the entire contents of which are hereby incorporated by reference.

CROSS-REFERENCE TO RELATED APPLICATION

The entire disclosure of Japanese Patent Application No. Tokugan 2003-146403 which was filed on May 23, 2003, including specification, claims, drawings and summary is incorporated herein by reference in its entirety.

BACKGROUND OF THE INVENTION

1. Field of the Invention

The invention relates to a helicopter, and more particularly to a helicopter having a downwash flow control function.

2. Description of Related Art

Spraying of chemicals or fertilizers using a helicopter has been put into practice in an agricultural field or the like. In such spraying operation, the helicopter generally maintains low speed almost hovering at the height of having high influence of ground effect so as to adhere the chemicals in mist even to the backside of leaves of crops to be sprayed, effectively utilizing the downwash generated by the rotation of a rotor of the helicopter.

Figure 6:
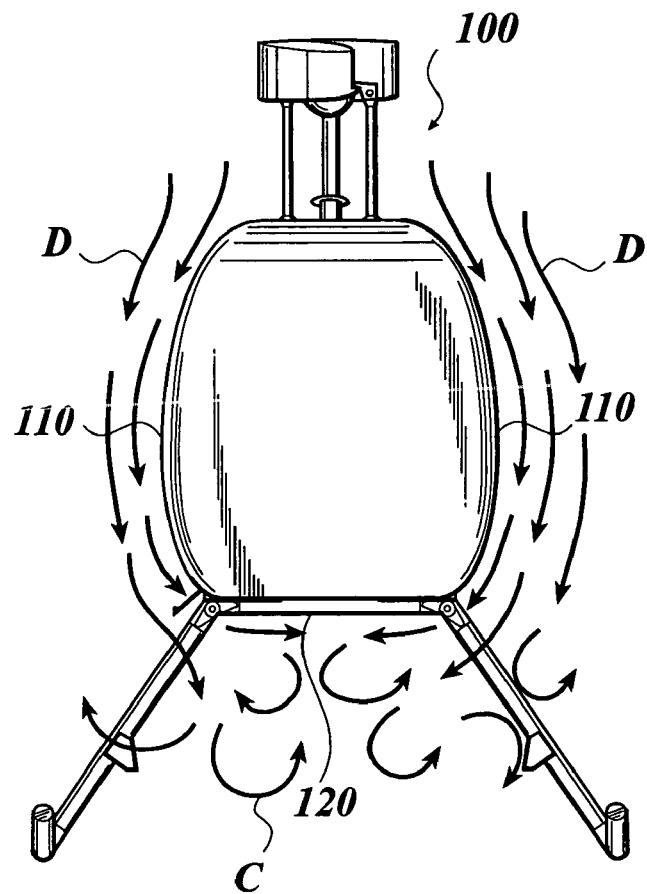
Figure 7:
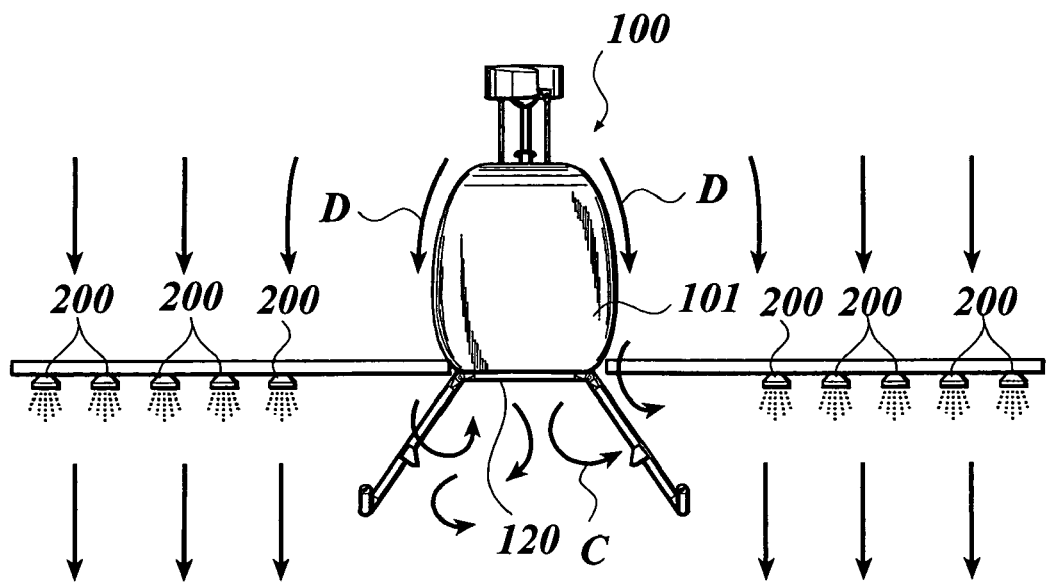

FIG. 6 shows a downwash flow generated by the rotor rotation of the helicopter. It has been known that, as shown in FIG. 6, the downwash D flows downward at high speed along fuselage side surfaces 110 of a helicopter 100 and separates at a fuselage lower surface 120 to produce irregular air current C. Therefore, when spraying nozzles are disposed at the lower surface 120, the irregular air current C causes lots of chemicals to adhere to the lower surface 120, and the adhered chemicals fall as droplets or a part of chemicals is sometimes not sprayed, resulting in lower spraying efficiency. In order to avoid this, nozzles 200 are often disposed apart from a fuselage 101 of the helicopter 100 as shown in FIG. 7.

Recently, various kinds of technologies have been proposed for controlling such downwash flow. For instance, such a technology is disclosed that, by providing a flow control device (a forming member, a drift plate, a cover, etc.) at the upper part of a helicopter fuselage, a rescuer or a worker positioned under the fuselage can avoid being directly exposed to a strong downwash (see, for example, JP-Tokukaihei-7-47998A).

When spraying chemicals using a helicopter, it is effective to diffuse the chemicals by the downwash generated by the rotor rotation of the helicopter. However, the technology described in above JP-Tokukaihei-7-47998A would lead to a problem that it cannot effectively utilize the downwash.

If adopted the technology that uses nozzles disposed apart from the helicopter fuselage (see FIG. 7), supporting members having nozzles mounted thereon need to be long in order to avoid adhesion of chemicals to the lower part of the fuselage due to the downwash, resulting in weight increase of the helicopter. Accordingly, it has long been desired to develop a new technology for reducing the weight of a helicopter and simultaneously for improving spraying efficiency.

When spraying chemicals or the like, the helicopter keeps low speed almost hovering flight at the height of having high influence of ground effect as described before, and therefore the generation of irregular air current under the fuselage due to the downwash leads to a problem of impairing the stability of the body during flight, and reducing controllability.

SUMMARY OF THE INVENTION

The present invention provides a helicopter for use in spraying chemicals or the like, which improves spraying efficiency by preventing the chemicals from adhering to the lower surface of a fuselage with effective use of a downwash, and improves stability and controllability of the body during flight such as spraying flight in which low speed almost hovering is sustained at the height of having high influence of ground effect.

In accordance with a first aspect of the present invention, a helicopter comprises: a flow control device provided at one of a lower portion of a side surface of a fuselage and a portion on a lower surface of the fuselage near the side surface and extending downward.

According to the helicopter of the first aspect of the invention, with the flow control device provided, extending downward, at one of the lower portion of the fuselage side surface and the portion on the lower surface of the fuselage near the side surface, the downwash flowing along the fuselage side surfaces is guided outward apart from the fuselage, maintaining a steady flow. Therefore, the downwash reaches the ground surface as a steady flow irrespective of the fuselage, allowing chemicals or the like to be effectively diffused when the helicopter sprays the chemicals or the like.

Also, according to the helicopter of the first aspect of the invention, the flow control device also prevents the downwash from flowing into the under side of the fuselage, which suppresses generation of irregular air current under the fuselage. This air current prevents the chemicals from adhering to the fuselage lower surface when the helicopter sprays the chemicals or the like, to thereby improve spraying efficiency and also eliminate removing work of the chemicals adhering to the fuselage lower surface.

Further, according to the helicopter of the first aspect of the invention, since the flow control device suppresses the generation of irregular air current under the fuselage, the body posture can be stabilized, and further body controllability can be remarkably improved during the flight such as the spraying flight in which low speed almost hovering is sustained at the height of having high influence of ground effect.

In accordance with a second aspect of the present invention, a helicopter comprises: a flow control device provided at one of a lower portion of a side surface of a fuselage and a portion on a lower surface of the fuselage near the side surface, for guiding a downwash flowing along the side surface of the fuselage to flow apart from the fuselage.

According to the helicopter of the second aspect of the invention, with the flow control device provided, extending downward, at one of the lower portion of the fuselage side surface and the portion on the lower surface near the side surface of the fuselage, the downwash flowing along the fuselage side surfaces is guided outward apart from the fuselage. Accordingly, the downwash can generate a circulating flow at the sides of the fuselage, allowing chemicals or the like to be effectively diffused when the helicopter sprays the chemicals or the like.

Also, according to the helicopter of the second aspect of the invention, the flow control device is provided at one of the lower portion of the fuselage side surface and the portion on the lower surface of the fuselage near the side surface so that the downwash flowing along the fuselage side surfaces is guided outward apart from the fuselage, which prevents the downwash from flowing into the under side of the fuselage. This suppresses generation of irregular air current under the fuselage. Accordingly, when the helicopter sprays the chemicals or the like, the chemicals are prevented from adhering to the fuselage lower surface, resulting in improvement of spraying efficiency and also elimination of removing work of the chemicals adhering to the fuselage lower surface.

Further, according to the helicopter of the second aspect of the invention, Since the flow control device suppresses the generation of irregular air current under the fuselage, the body posture can be stabilized, and further body controllability can be remarkably improved during the flight such as the spraying flight in which low speed almost hovering is sustained at the height of having high influence of ground effect.

In accordance with a third aspect of the invention, a helicopter comprises: a projection member provided at one of a lower portion of a side surface of a fuselage and a portion on a lower surface of the fuselage near the side surface and projecting downward.

According to the helicopter of the third aspect of the invention, since the projecting member is provided projecting downward at one of the lower portion of the fuselage side surface and the portion on the lower surface of the fuselage near the side surface, the downwash flowing along the fuselage side surfaces is prevented from flowing into the under side of the fuselage. This suppresses generation of irregular air current under the fuselage. Accordingly, when the helicopter sprays the chemicals or the like, the chemicals are prevented from adhering to the fuselage lower surface, resulting in improvement of spraying efficiency and also elimination of removing work of the chemicals adhering to the fuselage lower surface.

Also, according to the helicopter of the third aspect of the invention, since the projecting member suppresses the generation of irregular air current under the fuselage, the body posture can be stabilized, and further body controllability can be remarkably improved during the flight such as the spraying flight in which low speed almost hovering is sustained at the height of having high influence of ground effect.

Preferably, the helicopter further comprises a flow channel within the fuselage for guiding a downwash on an upper side of the fuselage to a lower side of the fuselage.

Accordingly, since the flow channels are provided within the fuselage for guiding the downwash on the upper side of the fuselage to the lower side of the fuselage, the air is replenished to the lower space of the fuselage, which always keeps the pressure of the lower space positive. This positive pressure securely prevents the downwash flowing along the fuselage side surfaces from flowing into the lower side of the fuselage, thereby effectively suppressing the generation of irregular air current at the lower side of the fuselage.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein;

FIG. 1 is a front view of a helicopter according to a first embodiment of the present invention;

FIG. 2 is a side view of the helicopter shown in FIG. 1 (with a flow control plate provided at an almost entire length of a lower portion of a fuselage side surface);

FIG. 3 is a side view of the helicopter shown in FIG. 1 (with divided flow control plates provided separately at the lower portion of the fuselage side surface);

FIG. 4 is a front view of a helicopter according to a second embodiment of the present invention;

FIG. 5 is a sectional side view of the helicopter shown in FIG. 4.

FIG. 6 is a front view of a helicopter of an earlier technique; and

FIG. 7 is a front view of the helicopter of FIG. 6 provided with nozzles for spraying chemicals.

DETAILED DESCRIPTION OF THE PRESENT INVENTION

Embodiments of the invention will be described in detail with reference to the drawings.

First Embodiment

Referring to FIGS. 1 to 3, a construction of a helicopter 1 according to the first embodiment will be explained. The helicopter 1 comprises a fuselage 2, a main rotor 4 attached to the upper portion of the fuselage 2 via a rotor shaft 3, skids 5 attached to the lower portion of the fuselage 2, a tail boom 6 coupled to the fuselage 2 at its rear side, a tail rotor 7 attached to a rear tip of the tail boom 6, flow control plates 8 mounted on the lower portions of both side surfaces 2*a* of the fuselage 2, and the like (see FIGS. 1 and 2). The helicopter 1 is used for spraying chemicals or fertilizers, and provided with spraying nozzles (not shown) on a lower surface 2*b* of the fuselage 2.

Installed at the inside of the fuselage 2 are a pilot's seat, a cargo compartment, and further an engine for driving the main rotor 4 and the tail rotor 7, and control devices such as a cyclic stick, a collective stick and a pedal. Rotation of the main rotor 4 driven by the engine generates a downwash D as shown in FIG. 1.

The flow control plates 8 are one example of a flow control device and a projecting member of the invention, and attached to the lower portions of both side surfaces 2*a* of the fuselage 2, projecting downward on a slant (right-side downward and left-side downward in FIG. 1). That is, the flow control plates 8 look truncated chevron shaped when viewed from the front of the helicopter 1 (see FIG. 1). The flow control plates 8 guide the downwash D, which flows along both side surfaces 2*a*, right-side downward and left-side downward of FIG. 1, respectively, so as to flow apart from the fuselage 2, preventing the downwash D from flowing into a lower space U of the fuselage 2.

The flow control plates 8 are provided at the lower portions of both side surfaces 2*a* of the fuselage 2, extending to a front-and-rear direction. The plates 8 may be provided, extending to the front-and-rear direction, at almost entire length of the lower portions of both side surfaces 2*a* (see FIG. 2), or dividedly provided at front portions B, center portions C and rear portions D (see FIG. 3). The plates 8 can be made of various metals, various synthetic resins, various rubber material, wood, and composite material composed of these materials.

The height of each flow control plate 8 (length in a direction normal to the fuselage side surface 2a) is set to larger value than the thickness of a boundary layer on the side surface 2a. While the downwash D flows along both side surfaces 2a, it has higher flowing speed in the area apart from the side surface 2a by a certain distance (the thickness of the boundary layer) under less influence of viscosity. On the other hand, the downwash D flows at low speed in the area close to the side surface 2a (in the boundary layer) under the influence of viscosity. Therefore, in order to control the downwash D by the flow control plates 8, the height of the plate 8 needs to be set to larger value than the thickness of the boundary layer. In the embodiment, the height of the plate 8 is set to about 40 mm.

Figure 1:
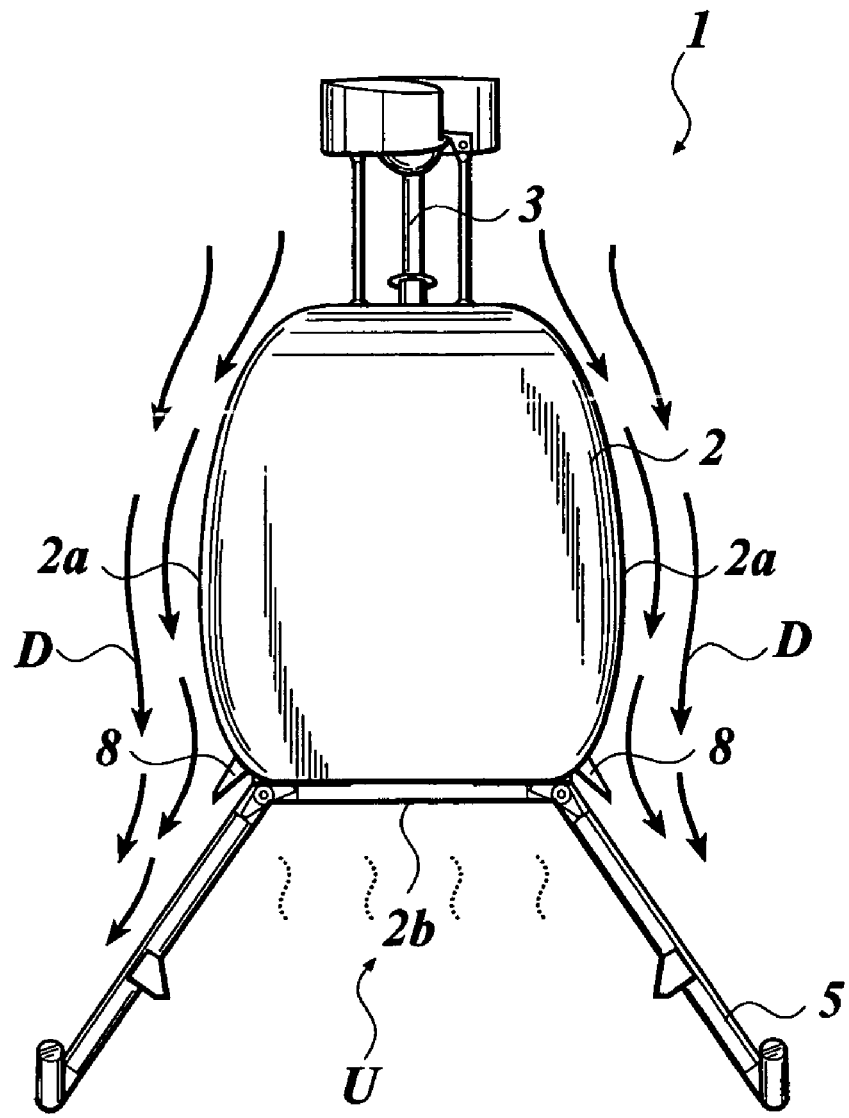
Figure 1:
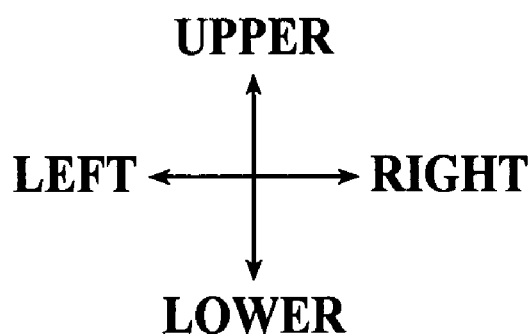
Figure 2:
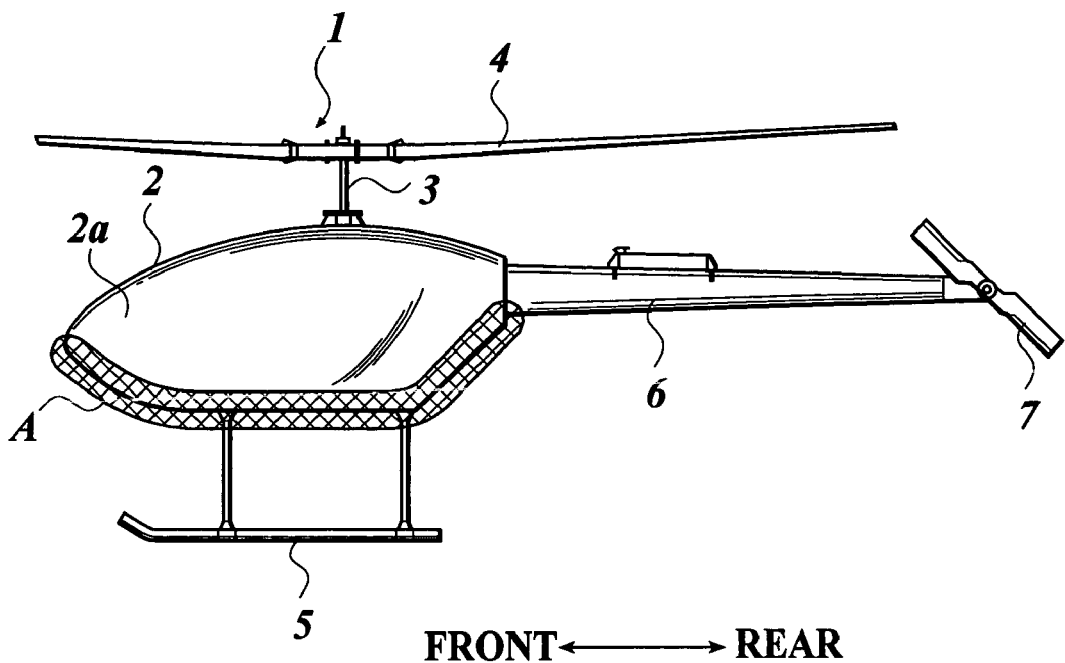
Figure 3:
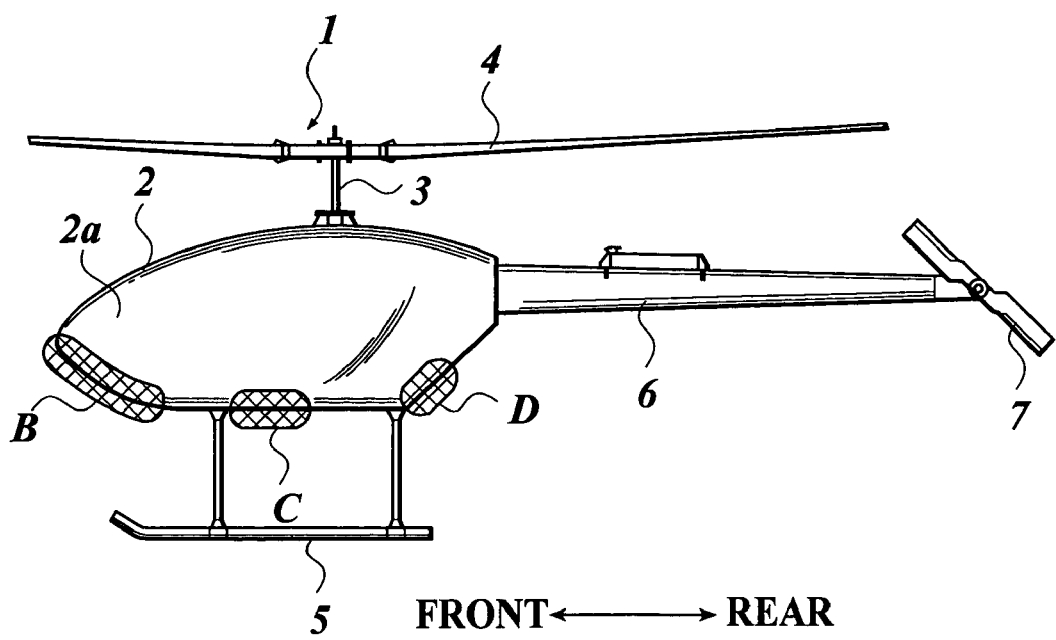

In the helicopter 1 of the embodiment, the downwash D flowing along both side surfaces 2a is guided, by the flow control plates 8 mounted at lower portions of both side surfaces 2a, right-side downward or left-side downward of FIG. 1 so as to flow apart from both side surfaces 2a, while keeping a steady flow. Accordingly, the downwash D reaches the ground surface as a steady flow irrespective of the fuselage 2, allowing the chemicals to adhere even to the back of leaves of crops to be sprayed.

In the helicopter 1 of the embodiment, the flow control plates 8 are mounted at the lower portions of both side surfaces 2a so as to guide the downwash D outward apart from the fuselage 2, which prevents the downwash D from flowing into a lower space U of the fuselage 2 (see FIG. 1). This prevents generation of irregular air current at the lower space U of the fuselage 2, thereby preventing chemicals from adhering to the lower surface 2b of the fuselage 2. This improves spraying efficiency and also eliminates removing work of chemicals adhering to the lower surface 2b of the fuselage 2.

When chemicals adhere to the fuselage lower surface 2b, the chemicals are condensed to high concentration. When the highly concentrated chemicals are removed at a different place other than the sprayed place, it sometimes causes environmental pollution. However, the flow control plates 8 mounted on the helicopter 1 of the embodiment prevents chemicals from adhering to the lower surface 2b of the fuselage 2, avoiding the environmental pollution caused by the removal of the chemicals.

If adopted the technology that uses nozzles disposed apart from the helicopter fuselage 2 (see FIG. 7), supporting members having nozzles mounted thereon need to be long, which increases body weight and sometimes decreases spraying efficiency due to disorderly supply of chemicals to the nozzles. On the other hand, the helicopter 1 of the embodiment is provided with the flow control plates 8, which prevents chemicals from adhering to the lower surface 2b of the fuselage 2, allowing the nozzles to be disposed on the lower surface 2b of the fuselage 2. This disposition allows reducing the body weight and also improving spraying efficiency with stable supply of chemicals or the like.

The helicopter 1 of the embodiment is provided with the flow control plates 8 at the lower portions of both side surfaces 2a of the fuselage 2, which suppresses the generation of irregular air current at the lower space U of the fuselage 2. Therefore, the body posture can be stabilized, and further body controllability can be remarkably improved during the flight such as the spraying flight in which low speed almost hovering is sustained at the height of having high influence of ground effect.

Second Embodiment

A description will be given of the structure of a helicopter 10 according to a second embodiment with reference to FIGS. 4 and 5. The helicopter 10 of the embodiment is such that particular flow channels are provided within the fuselage 2 of the helicopter 1 according to the first embodiment, each flow channel guiding the downwash D on an upper side of the fuselage 2 to the lower space U of the fuselage 2. Therefore, the same elements as corresponding elements of the helicopter 1 are designated by the same reference numerals.

Figure 4:
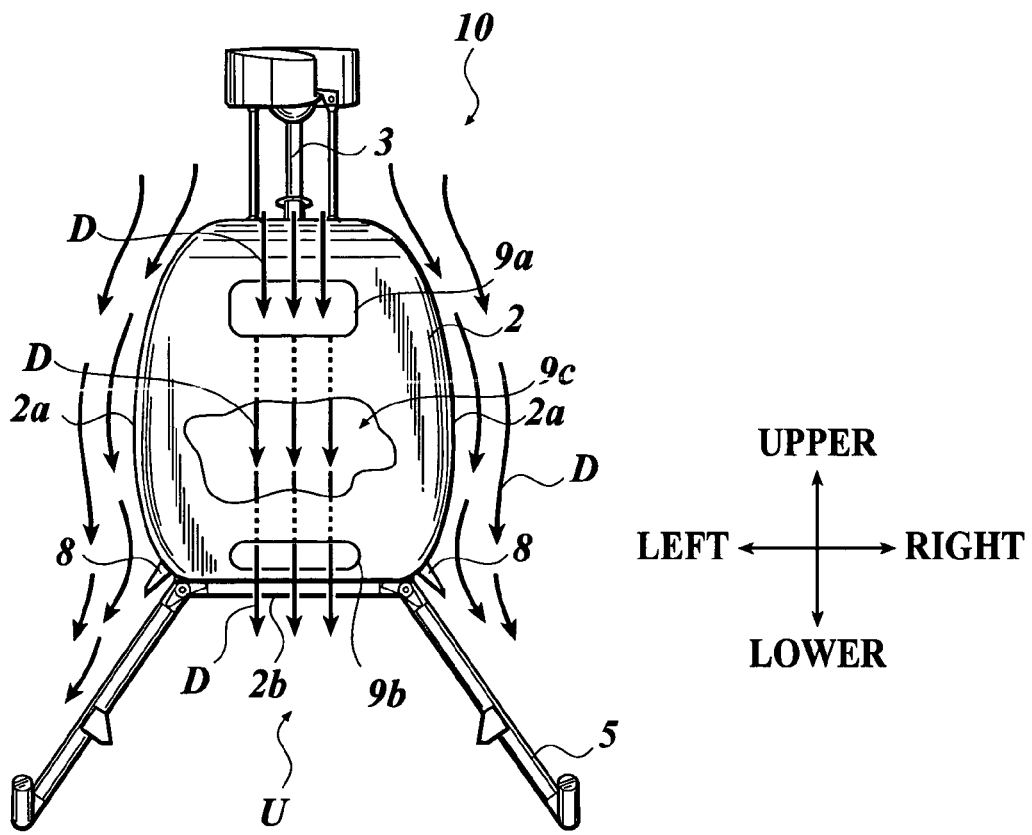
Figure 5:
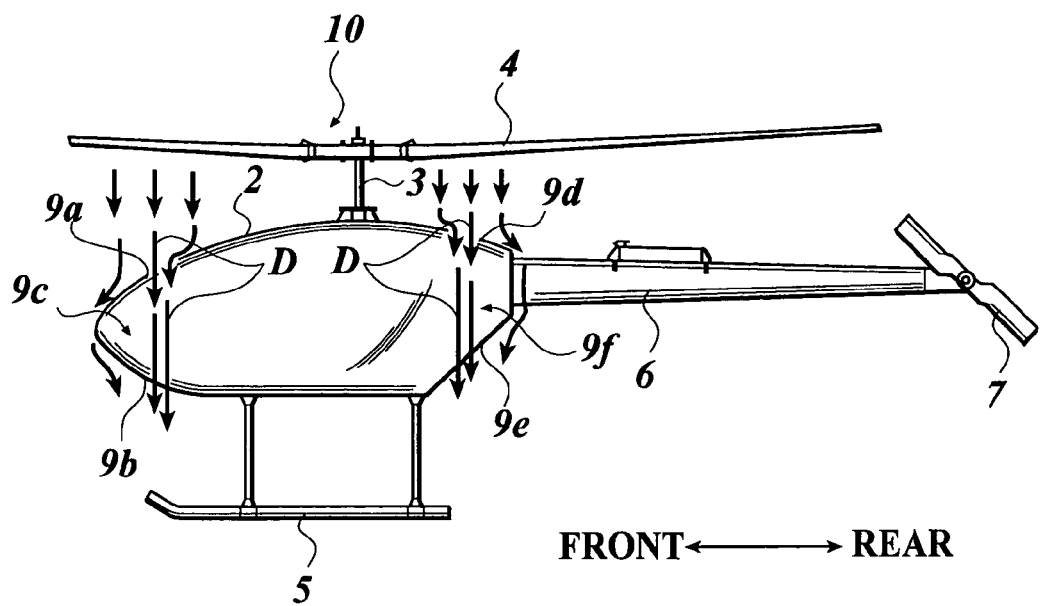

There are provided at the front of the fuselage 2 of the helicopter 10 an upper opening portion 9a and a lower opening portion 9b, and at front side within the fuselage 2 a hollow portion 9c (see FIGS. 4 and 5). These upper opening portion 9a, lower opening portion 9b and hollow portion 9c form a flow channel in the present invention. The downwash D generated by the rotation of the main rotor 4 of the helicopter 10 flows from the upper opening portion 9a into the hollow portion 9c of the fuselage 2, and flows out from the lower opening portion 9b to the lower space U.

There are also provided at the rear of the fuselage 2 of the helicopter 10 an upper opening portion 9d and a lower opening portion 9e, and at rear side within the fuselage 2 a hollow portion 9f (see FIG. 5). These upper opening portion 9d, hollow portion 9f and lower opening portion 9e form another flow channel in the present invention. The downwash D generated by the rotation of the main rotor 4 flows from the upper opening portion 9d into the hollow portion 9f, and flows out from the lower opening portion 9e to the lower space U.

In the helicopter 10 of the embodiment, the downwash D over the fuselage 2 can be guided to the lower space U through the flow channels within the fuselage 2, the channels being formed by the upper opening portions 9a and 9d of the fuselage 2, the hollow portions 9c and 9f within the fuselage 2, and the lower opening portions 9b and 9e of the fuselage 2, respectively, (see FIGS. 4 and 5). Therefore, the air is replenished to the lower space U of the fuselage 2, which always keeps the pressure of the lower space U positive. This positive pressure securely prevents the downwash D, which flows along both side surfaces 2a and the flow control plates 8, from flowing into the lower space U, thereby effectively suppressing the generation of irregular air current at the lower space U.

The flow control plates 8 in the embodiments are attached in a truncated chevron shape when viewed from the front (extending right-side downward or left-side downward in FIGS. 1 and 4), but the attaching angle of the flow control plate 8 with respect to the side surface 2a is properly changeable. Further, the flow control plates 8 which are extendable and retractable may be provided, the plates 8 may be extended outward from the side surfaces 2a during spraying chemicals, and retracted into the fuselage 2 during normal flights.

In the embodiments, the flow control plates 8 are provided symmetrical to each other at both side surfaces 2a (see FIGS. 1 and 4), but they may not be always symmetrical. Especially, when flowing directions of the downwash D considerably differ between right side and left side of the fuselage 2 depending on rotating directions of the main rotor 4, the flow control plates 8 may be preferably provided depending on the flowing directions of the downwash D.

Further, the flow control plates 8 in the embodiments are mounted exemplarily at the lower portions of both side surfaces 2a (see FIGS. 1 and 4), but may be mounted at sides of the lower surface 2b of the fuselage 2 (neighboring the side surfaces 2a) extending downward on a slant (right-side downward and left-side downward in FIGS. 1 and 4). Even with the flow control plates 8 thus mounted at the sides of the lower surface 2b of the fuselage 2, the downwash D flowing along the side surfaces 2a can be guided outward apart from the fuselage 2.

The flow control plates 8 in the embodiments are employed as the flow control device and the projecting member, but a block type member may be employed as the flow control device and the projecting member instead of the plate type member. That is, if a structure has a function of guiding the downwash D to flow along the side surfaces 2a outward apart from the fuselage 2, the structure of any kind can be employed as the flow control device and the projecting member.

In the second embodiment, while the flow channels are formed within the fuselage 2 with the opening portions provided at the upper and lower portions of the fuselage 2 so as to pass through the hollow portions, it is not always necessary to provide walls or the like along the flow channels. The shape of the flow channels (areas/shapes of the upper opening portions 9a, 9d and the lower opening portions 9b, 9e, and volumes/shapes of the hollow portions 9c, 9f) may also be properly decided according to flowing speed and the like of the downwash D.

According to the present invention, with the flow control device provided, extending downward, at one of the lower portion of the fuselage side surface and the portion on the lower surface of the fuselage near the side surface, the downwash flowing along the fuselage side surfaces is guided outward apart from the fuselage, maintaining a steady flow. Therefore, it can effectively utilize the downwash when diffusing chemicals or the like by the helicopter.

Also, according the present invention, the flow control device or the projection member prevents the downwash from flowing into the under side of the fuselage, which suppresses generation of irregular air current under the fuselage. This air current prevents the chemicals from adhering to the fuselage lower surface when the helicopter sprays the chemicals or the like, to thereby improve spraying efficiency and also eliminate removing work of the chemicals adhering to the fuselage lower surface.

Further, by providing the flow channels within the fuselage for guiding the downwash on the upper side of the fuselage to the lower side of the fuselage, it is securely prevented that the downwash flowing along the fuselage side surfaces flows into the lower side of the fuselage, thereby effectively suppressing the generation of irregular air current at the lower side of the fuselage.

What is claimed is:

1. A helicopter having a fuselage section and a tail section coupled to the fuselage section, the helicopter comprising:
    spray nozzles, for spraying fluid, provided on a lower surface of the fuselage section directly or indirectly; and
    a rigid flow control device provided at one of a lower portion of a side surface of the fuselage section and a portion on the lower surface of the fuselage section near the side surface,
    wherein the flow control device extends outward of the fuselage section and downward to direct a downwash, flowing along the side surface of the fuselage section, away from the side surface to prevent the sprayed fluid from adhering to the lower surface of the fuselage section.

2. The helicopter as claimed in claim 1, further comprising:
    a flow channel within the fuselage section for guiding a downwash on an upper side of the fuselage section to a lower side of the fuselage section.

3. The helicopter as claimed in claim 1, wherein the rigid flow control device is provided along substantially an entire length of the lower portion of the side surface.

4. The helicopter as claimed in claim 1, wherein the flow control device is dividedly provided at a front portion, a center portion and a rear portion of the side surface of the fuselage.

5. The helicopter as claimed in claim 1, wherein the flow control device is made of any one of a metal, a synthetic resin, a rubber material, a wood, and a composite material thereof.

6. The helicopter as claimed in claim 1, wherein a height of the flow control device is set to a larger value than a thickness of a boundary layer on the side surface, in which the downwash is under an influence of viscosity by the side surface.

7. The helicopter as claimed in claim 1, wherein the flow control device extending downward is extending in an obliquely downward direction outward the fuselage.

8. The helicopter as claimed in claim 1, wherein the flow control device is extended outward from the side surface during spraying of the fluid, and retracted into the fuselage during normal flights.

9. A helicopter having a fuselage section and a tail section coupled to the fuselage section, the helicopter comprising:
    spray nozzles, for spraying fluid, provided on a lower surface of the fuselage section directly or indirectly; and
    a rigid projection member provided at one of a lower portion of a side surface of the fuselage section and a portion on the lower surface of the fuselage section near the side surface,
    wherein the projection member projects outward of the fuselage section and downward to direct a downwash, flowing along the side surface of the fuselage section, away from the side surface to prevent the sprayed fluid from adhering to lower surface of the fuselage section.

10. The helicopter as claimed in claim 9, further comprising:
    a flow channel within the fuselage section for guiding a downwash on an upper side of the fuselage section to a lower side of the fuselage section.

11. The helicopter as claimed in claim 9, wherein the rigid projection member is provided along substantially an entire length of the lower portion of the side surface.

12. The helicopter as claimed in claim 9, wherein the rigid projection member is dividedly provided at a front portion, a center portion and a rear portion of the side surface of the fuselage.

13. The helicopter as claimed in claim 9, wherein the rigid projection member is made of any one of a metal, a synthetic resin, a rubber material, a wood, and a composite material thereof.

14. The helicopter as claimed in claim 9, wherein a height of the rigid projection member is set to a larger value than a thickness of a boundary layer on the side surface, in which the downwash is under an influence of viscosity by the side surface.

15. The helicopter as claimed in claim 9, wherein the rigid projection member projecting downward is projecting in an obliquely downward direction outward the fuselage.

16. The helicopter as claimed in claim 9, wherein the rigid projection member is extended outward from the side surface during spraying of the fluid, and retracted into the fuselage during normal flights.

17. A helicopter having a fuselage section and a tail section coupled to the fuselage section, the helicopter comprising:
   spray nozzles, for spraying fluid, provided on a lower surface of the fuselage section directly or indirectly; and
   a rigid flow control device provided at one of a lower portion of a side surface of the fuselage section and a portion on the lower surface of the fuselage section near the side surface to direct a downwash, flowing along the side surface of the fuselage section, away from the side surface to prevent the sprayed fluid from adhering to the lower surface of the fuselage section,
   wherein the flow control device is provided along substantially an entire length of the lower portion of the side surface.

18. The helicopter as claimed in claim 17, further comprising:
   a flow channel within the fuselage section for guiding a downwash on an upper side of the fuselage section to a lower side of the fuselage section.

19. The helicopter as claimed in claim 17, wherein the rigid flow control device is made of any one of a metal, a synthetic resin, a rubber material, a wood, and a composite material thereof.

20. The helicopter as claimed in claim 17, wherein a height of the rigid flow control device is set to a larger value than a thickness of a boundary layer on the side surface, in which the downwash is under an influence of viscosity by the side surface.

21. The helicopter as claimed in claim 17, wherein the rigid flow control device is extended outward from the side surface during spraying of the fluid, and retracted into the fuselage during normal flights.

22. A helicopter having a fuselage section and a tail section coupled to the fuselage section, the helicopter comprising:
   spray nozzles, for spraying fluid, provided on a lower surface of the fuselage section directly or indirectly; and
   a rigid flow control device provided at one of a lower portion of a side surface of the fuselage section and a portion on the lower surface of the fuselage section near the side surface to direct a downwash, flowing along the side surface of the fuselage section, away from the side surface to prevent the sprayed fluid from adhering to the lower surface of the fuselage section,
   wherein the flow control device is dividedly provided at a front portion, a center portion and a rear portion of the side surface of the fuselage.

23. The helicopter as claimed in claim 22, wherein the rigid flow control device is made of any one of a metal, a synthetic resin, a rubber material, a wood, and a composite material thereof.

24. The helicopter as claimed in claim 22, wherein a height of the rigid flow control device is set to a larger value than a thickness of a boundary layer on the side surface, in which the downwash is under an influence of viscosity by the side surface.

25. The helicopter as claimed in claim 22, wherein the rigid flow control device is extended outward from the side surface during spraying of the fluid, and retracted into the fuselage during normal flights.

26. A helicopter having a fuselage section and a tail section coupled to the fuselage section, the helicopter comprising:
   spray nozzles, for spraying fluid, provided on a lower surface of the fuselage section directly or indirectly; and
   a flow control device extending in the front-and-rear direction, provided at one of a lower portion of a side surface of the fuselage section and a portion on the lower surface of the fuselage section near the side surface to direct a downwash, flowing along the side surface of the fuselage section, away from the side surface to prevent the sprayed fluid from adhering to the lower surface of the fuselage section.

27. The helicopter as claimed in claim 26, wherein the flow control device is extended outward from the side surface during spraying of the fluid, and retracted into the fuselage during normal flights.

28. A helicopter having a fuselage section and a tail section coupled to the fuselage section, the helicopter comprising:
   spray nozzles, for spraying fluid, provided on a lower surface of the fuselage section; and
   a rigid flow control device provided at one of a lower portion of a side surface of the fuselage section and a portion on the lower surface of the fuselage section near the side surface,
   wherein the flow control device extends outward of the fuselage section and downward to direct a downwash, flowing along the side surface of the fuselage section, away from the side surface to prevent the sprayed fluid from adhering to the lower surface of the fuselage section.

* * * * *